United States Patent

[11] 3,533,347

[72] Inventors Robert D. Auguste
Granada Hills;
Karl H. Gensike, Los Angeles, California
[21] Appl. No. 753,596
[22] Filed Aug. 19, 1968
[45] Patented Oct. 13, 1970
[73] Assignee By mesne assignments, to
Instrumentation Marketing Corporation,
Burbank, Calif.,
a corporation of California

[54] AUTOMATIC EXPOSURE CONTROL FOR CAMERAS
5 Claims, 5 Drawing Figs.
[52] U.S. Cl. ................................................. 95/64
[51] Int. Cl. .................................................. G03b 9/24
[50] Field of Search ............................ 95/10, 12.5, 64; 355/68, 71

[56] References Cited
UNITED STATES PATENTS
3,076,378  2/1963  Biedermann ................ 355/68
3,480,363  11/1969  Stewart ...................... 355/68

*Primary Examiner* — John M. Horan
*Attorney* — Pastoriza and Kelly

ABSTRACT: An automatic exposure control for a camera comprises a variable iris opening lens, a light sensor for providing a sensing signal, a feedback potentiometer coupled to the iris opening control for providing a control signal constituting a function of the size of the iris opening, a computer responsive to the sensing and control signals for providing an error signal constituting a function of the difference between the sensing and control signals, and a drive motor coupled to the potentiometer and responsive to the error signal to vary the potentiometer and thus the size of the iris opening in a manner to null the error signal. The light sensor includes interchangable light tubes so that the acceptance angle of light may be varied to match the particular lens being employed or alternatively, select only a desired area of an object in an overall scene to provide a desired exposure. Further, the light sensor control includes a film and shutter speed dial assembly incorporating a control clutch for enabling manual variation of the feedback potentiometer without varying the iris opening control in such a manner that a calibrated bias may be set into the potentiometer to adjust for the speed of film used in the camera relative to the shutter speed of the camera. A further feature contemplates the provision of an auxiliary remote light sensor such that the iris control of the camera lens is responsive to light variations at a location remote from the camera.

Patented Oct. 13, 1970

3,533,347

INVENTORS:
ROBERT DEAN AUGUSTE
KARL H. GENSIKE
BY
Elliott & Pastoriza
ATTORNEYS

AUTOMATIC EXPOSURE CONTROL FOR CAMERAS

This invention relates generally to automatic exposure control systems for cameras and more particularly to an improved automatic exposure control for motion picture cameras used on aircraft or military photographic operations.

BACKGROUND OF THE INVENTION

Motion picture cameras normally mounted in the nose portions of aircraft invariably require some type of automatic exposure control. Thus when the aircraft is diving towards the ground, the incoming light is substantially less requiring a larger stop opening for the camera than is the case when the aircraft pulls out of the dive with its nose pointed skyward. Further, in filming bomb explosions, antiaircraft bursts, and the like during actual combat, the light exposures vary enormously. In some instances, it may be desirable to film only the burst itself of a bomb or antiaircraft missile excluding in large part the surrounding sky area. In other instances it may be desirable to provide properly exposed motion pictures of a background area even though a relative concentrated light spot may be present. In still other circumstances, it may be desirable to control the exposure to the camera film by a suitable light sensor completely separated from the camera so that the stop opening for the camera is controlled by lighting conditions remote from the camera.

In providing a useful automatic exposure control under such conditions, several features are necessary. First, the response time of the exposure control to changing light conditions should be adjustable in accord with the particular scenes being filmed. Second, the calibration of the exposure control should be made as simple as possible and towards this end, account must be taken of the speed of the film employed in the camera when a new film is used. Third, the sensing of light should be controllable in accord with the type of scene being photographed; for example, the acceptance angle of light received in the sensor should be controllable to correspond to a given area of an object for which a proper exposure is to be provided, or if the area encompasses an entire scene, to the acceptance angle of the particular lens used. Fourth, a remote light sensing assembly should be available so that the lens opening of the camera may be automatically responsive to lighting conditions at areas remote from the camera. Finally, the entire automatic exposure control system should be light, compact, reliable, and require a minimum of power particularly when the mechanism is utilized in aircraft.

BRIEF SUMMARY OF THE PRESENT INVENTION

With the foregoing in mind, the present invention comprehends a vastly improved automatic exposure control system particularly useful for 16 millimeter cameras used in military aircraft wherein the various desirable features described heretofore are fully realized.

More particularly, the improved automatic exposure control includes a lens mounting means for mounting a special lens having a variable iris both manually adjustable and automatically adjustable by means of a lens ring gear secured to the iris control. A light sensor assembly is secured to the lens mounting means and includes a light responsive cell and circuit for generating an electrical sensing signal constituting a function of the amount of light incident on the cell. A feedback potentiometer circuit in turn includes a potentiometer shaft and a shaft ring gear secured thereto. This shaft ring gear is coupled through a suitable gear coupling means to the lens ring gear and the circuit is such that a control signal will be provided constituting a function of the position of the potentiometer shaft and thus the lens iris opening. The sensing signal from the light sensor and the control signal from the potentiometer are received in a computer which generates an error signal constituting a function of the difference of the sensing and control signals. This error signal is employed to drive a stepper motor connected to the potentiometer shaft in such a manner as to rotate the shaft in a direction to null the error signal so that the iris opening of the lens is adjusted in size automatically in accord with the sensing signal.

With the foregoing arrangement, the stepper motor is deenergized whenever the iris opening is properly adjusted for the amount of light incident on the cell so that there is substantially very little power drain under standby conditions. Further, the light sensor assembly itself includes a unique film and shutter speed dial assembly mounted on the potentiometer shaft. This latter assembly includes a control clutch means for enabling rotation of the potentiometer shaft without rotating the shaft ring such that a calibrated bias may be set into the potentiometer to adjust for the speed of film used in the camera relative to the shutter speed. Also provided is a gear disengaging means in the gear coupling between the potentiometer shaft ring and lens ring to permit initial calibration.

Finally, provisions are made for changing the action of the stepper motor to vary the response time and also to enable an auxiliary light sensor assembly to be connected to the lens mount through a long cable so that the lens iris opening is automatically responsive to changing light conditions at a remote location.

BRIEF DESCRIPTION OF THE DRAWINGS

A better understanding of the preferred embodiment of the automatic exposure control will be had by now referring to the accompanying drawings in which.

DETAILED DESCRIPTION OF THE PREFERRED EMBODIMENT

Figure 1:
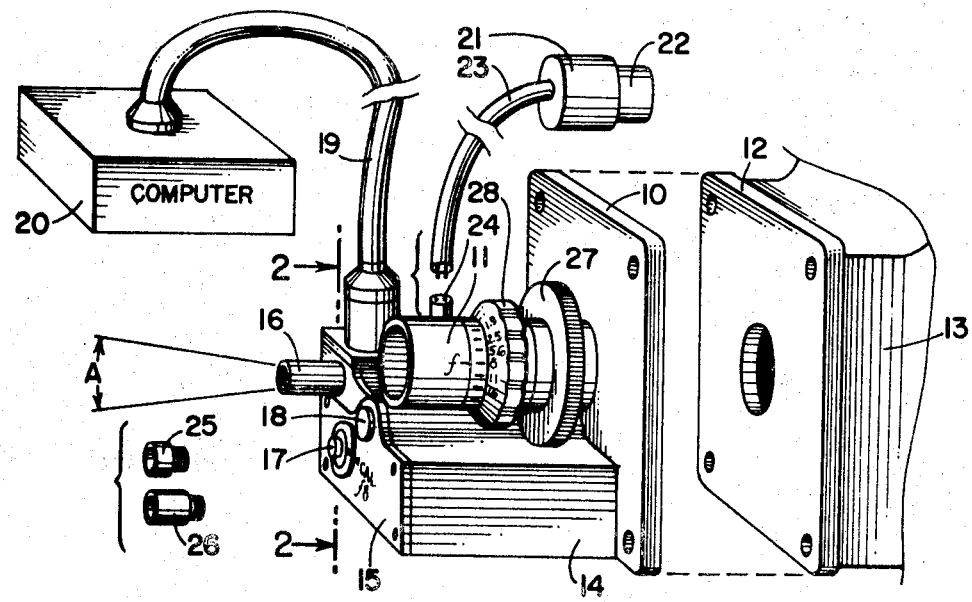
FIG. 1 is a general perspective view illustrating the exposure control of this invention preparatory to being mounted on the face of a motion picture camera.

Referring first to FIG. 1 there is shown a lens mounting means in the form of a plate 10 supporting a lens 11. The plate 10 is adapted to be mounted to a conventional mounting plate 12 on the front of a motion picture camera designated schematically at 13. In this respect, the mounting plate 10 is so designed as to fit standard camera mounts so that the structure may be used with several different types of cameras.

An automatic exposure control system is incorporated in a housing 14 secured to the plate 10 and provided with a cover plate 15. A light sensor assembly is incorporated in the housing 14 and includes a light tube means 16 positioned adjacent to the lens 11 for receiving light over a given acceptance angle such as indicated by the letter A in FIG. 1. The light sensor housing also includes a film and shutter speed dial assembly 17 in a readily accessible position. Also shown in FIG. 1 adjacent to the assembly 17 is a gear disengaging means manually operable as by a button 18.

The housing 14 incorporates a feedback potentiometer and stepper motor for effecting an automatic drive for changing the lens opening or iris size of the lens 11 all as will become clearer as the description proceeds. Suitable signal and power lines pass through a cable 19 to a computer 20 which may be disposed at a remote location if desired. In accord with a feature of the present invention, there may be provided a remote light sensor assembly indicated at 21 provided with a light tube means 22 similar to the light tube 16 and a long cable 23 arranged to be received in a cable jack 24 in the housing 14. When this remote light sensor assembly is employed, the light tube 16 is removed and light normally passing therein is blocked from the sensor within the housing 14 so that the remote sensor can take over.

With respect to the light sensor assembly, the design is such that different light tube means may be substituted for the light tubes 16 or 22. Auxiliary light tubes are illustrated in FIG. 1 at 25 and 26 and are so designed as to provide different acceptance angles depending upon the particular lens 11 employed. The optics for the light sensor which incorporates a photosensitive cell is such that the amount of total light integrated and received on the cell will be the same under any given lighting conditions for any one of the different tube means having different acceptance angles.

As shown in FIG. 1, the lens 11 includes an iris control ring gear 27 which, upon rotation, will change the size of the iris opening or "stop" of the lens. Also provided is a manually controllable *f* stop adjustment shown at 28.

In the general overall operation of the structure of FIG. 1, the plate 10 is mounted to the camera mounting plate 12. The lens ring gear 27 is coupled through a gear coupling means to the shaft for the potentiometer incorporated within the housing 14. The responsive cell receiving light through the light tube 16 generates a sensing signal. The potentiometer in turn provides a control signal constituting a function of the stop opening or position of the lens ring gear 27 by its gear coupling to the potentiometer shaft. The sensing and control signals in turn are passed to the computer 20 through the cable 19 and an error signal is generated constituting a function of the difference of the two signals. This error signal is employed to drive a stepper motor within the housing 14 which rotates the potentiometer shaft and thus the ring gear 27 through the coupling gear in such a manner as to null the error signal. The lens stop opening or iris size is thus automatically adjusted in accord with the incident light received in the light tube 16 so that automatic exposure control takes place.

Figure 2:
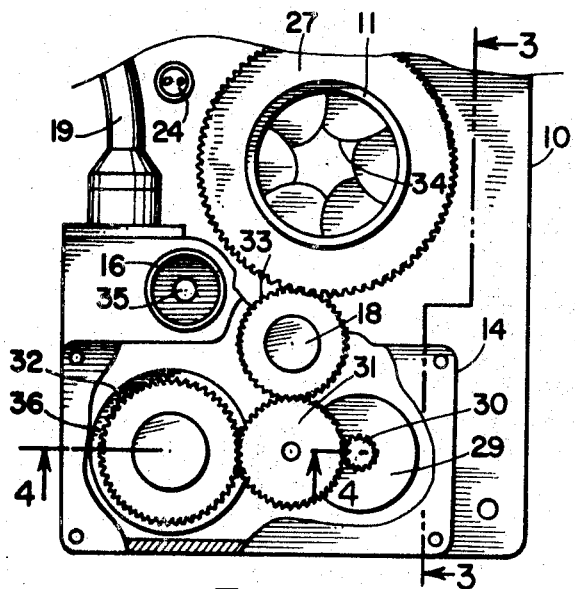
FIG. 2 is a fragmentary view partly in cross section taken in the direction of the arrows 2-2 of FIG. 1.
Figure 3:
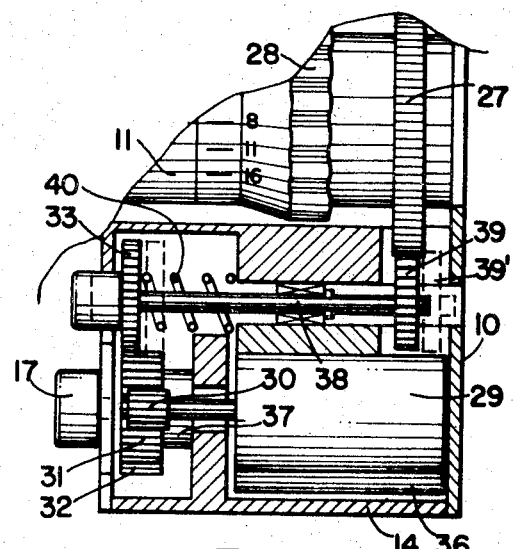
FIG. 3 is another fragmentary view partly in cross section taken generally in the direction of the arrows 3-3 of FIG. 2.

Referring now to the broken-away views of FIGS. 2 and 3, the stepper motor within the housing 14 is indicated at 29. The output stepper motor shaft terminates in a pinion gear 30 meshing with an idler gear 31 in turn engaging a potentiometer shaft ring gear 32. The idler gear 31 also meshes with a gear 33 coupled to the lens ring gear 27 through a gear coupling means. The arrangement is such that the potentiometer shaft gear 32 will rotate with the lens ring gear 27 through the medium of the idler gear 31, gear 33 and through further gears to be described, so that the position of the potentiometer gear is a function of the iris opening size. This iris opening is indicated at 34 in FIG. 2.

Also visible in FIG. 2 is the photoresponsive cell 35 concentrically aligned with the central axis of the light tube means 16.

With specific reference now to FIG. 3, the potentiometer itself is indicated at 36 behind the stepper motor 29. The shaft for this potentiometer is shown at 37 and terminates in the film and shutter speed dial assembly 17.

The gear coupling means between the potentiometer shaft gear 32 and lens ring gear 27 includes, in addition to the gear 33 a plunger shaft 38 terminating at its far end in a coupling gear 39 in actual mesh with the lens ring gear 27. A biasing spring 40 positions the gears 39 and 27 in coplanar meshing relationship. However, it will be clear that upon the pressing of the button 18, the shaft 38 together with gears 33 and 39 can be moved to the right as viewed in FIG. 3 thereby disengaging the gear 39 from the lens ring gear 27. The purpose for this gear disengaging means will become evident as the description proceeds.

Figure 4:
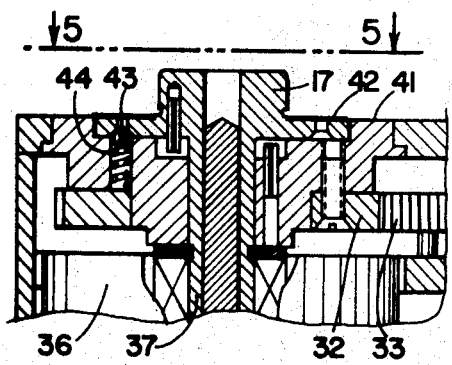
FIG. 4 is a fragmentary cross section taken in the direction of the arrows 4-4 of FIG. 2.
Figure 5:
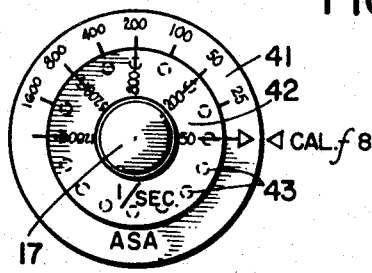
FIG. 5 is a fragmentary plan view taken in the direction of the arrows 5-5 of FIG. 4.

Referring now to FIGS. 4 and 5, it will be noted that the potentiometer shaft ring gear 32 is rigidly secured to an exposed ring scale 41 which, as illustrated in FIG. 5, is marked with various A.S.A. film speeds. Within the scale ring 41 there is provided a clutch means including the dial knob 17 and a ring-shaped shutter speed scale 42. The scale 42 is concentric with respect to the scale 41 as shown in FIG. 5.

With particular reference to FIG. 4, the knob 17 is clutched to the shaft ring gear 32 and associated assembly as by a plurality of detent balls such as 43 biased by springs 44 into suitable detents on the underside of the knob scale 42. The positioning of the ball detent means is illustrated in dotted lines in FIG. 5 and provides for detents at approximately every 7° and 30 minutes of relative rotational movement on the knob 17 relative to the potentiometer shaft ring gear 32.

The foregoing clutch arrangement permits rotation of the potentiometer shaft independent of the potentiometer shaft ring gear 32 so that a calibrated bias may be set into the potentiometer.

OVERALL OPERATION

In operation, it will be understood that light received in the light tube means 16 of FIG. 1 will impinge on the cell 35 thereby giving rise to the generation of a sensing signal constituting a function of the incident light. In addition, the iris opening or *f* stop of the lens will determine the position of the potentiometer shaft through the intermediary of the gear couplings described in FIGS. 2 and 3. Thus, the position of the potentiometer shaft will vary directly with the *f* setting for the lens. The potentiometer thus provides a control signal constituting a function of the position of its shaft.

The sensing signal and control signal are sent to the computer 20 of FIG. 1 through the cable 19 and an error signal constituting a function of the difference between the sensing signal and control signal is sent back to the light sensor assembly. This error signal is in the form of a series of pulses for driving the stepper motor to thereby rotate the potentiometer shaft through the medium of the idler gear 31 in a direction to null the error signal. Movement of the potentiometer shaft will simultaneously vary the iris opening in the lens through the potentiometer shaft gear 32 and coupling gears in the gear disengaging structure 33 and 39 coupling to the lens ring gear 27. Thus, the lens opening will be controlled in accord with the incident light received in the light tube means 16 all in an automatic manner.

With respect to the foregoing, the response time for a change in the iris setting to a change in lighting conditions can be controlled by the pulse frequency for driving the stepper motor and in this respect, the adjustment simply requires changing the frequency of a timing oscillator in the computer 20. Since the stepper motor moves the potentiometer shaft in a direction to null the error signal, when the iris opening has been properly set for the amount of light received in the light sensor, there will no longer be any signal supplied to the stepper motor and thus under standby conditions, power dissipation is minimized.

In order to calibrate the automatic exposure control, the disengaging gear means and film and shutter speed dial assembly are used. This calibration is carried out as follows:

The lens such as the lens of 11 of FIG. 1 is first initially mounted to the plate 10. During this operation, the gear disengaging structure is operated by depressing the button 18 of FIG. 1 to move the shaft 38 shown in FIG. 3 to the right thereby disengaging the gear 39 from the lens ring gear 27. With the lens properly mounted, the *f* stop for the lens is set at *f*–8 by the manual control 28 shown in FIG. 1. After the lens has been set at this calibration stop opening, the small triangle on the scale 14 designating A.S.A. film speed shown in FIG. 5 is positioned juxtaposed the calibration triangle on the stationary casing designated *f*–8. This position is illustrated in FIG. 5. The button portion 18 of the gear disengage assembly is now released so that the spring 40 of FIG. 3 will return the gear 39 into meshing relationship with the lens ring gear 27.

Assume, for the sake of example, that the A.S.A. film speed is 50 and that the shutter speed is 200. In this event, the respective scales 41 and 42 as shown in FIG. 5 are properly positioned relative to each other; that is, the shutter speed of 200 is in alignment with the A.S.A. film speed of 50. Either before or after this calibration, a proper light tube means such as indicated at 16 in FIG. 1 is selected for the particular type of lens 11 employed. The criterion here is to make sure that the angle of acceptance A for the light tube corresponds to the desired area of the object to be properly exposed.

With all of the foregoing adjustments completed, the camera may now be used with complete assurance of automatic exposure control so that proper exposure for all lighting conditions is realized.

If now the cameraman should change the film in the camera to a film having a different A.S.A. rating, and assuming that the shutter speed of 200 is to be the same, an adjustment is necessary. This compensation for the different film speed is effected by means of the clutch assembly knob 17 described in FIGS. 4 and 5. With the two triangles juxtaposed as shown and the lens setting at f–8, the operator will rotate the knob 17 with the ring gear 32 being held stationary in a manner to cause the shutter speed of 200 to be juxtaposed the new film speed. For example if the new film speed is 200 the knob 17 would be rotated approximately 45° in a counterclockwise direction. The potentiometer shaft ring gear 32 can be held against rotation during this knob movement by simple holding manually the ring gear 27 of the lens which, through the interlocking gear couplings will hold the potentiometer ring gear in a stationary position. The ball detent arrangement will permit a proper indexing of the knob for various known film speeds so that the adjustment may be made relatively quickly.

After the foregoing adjustment of the knob has been effected, the camera is now ready to take pictures with the new film with complete assurance of proper exposure. In this respect, it should be noted that rotating the knob 17 in the manner described essentially inserts a calculated bias into the potentiometer. That is, the potentiometer wiper arm is rotated relative to the potentiometer coils themselves without moving any of the gear trains to the lens iris ring gear. This prebias will always assure that the lens iris opening will be proper for the new film speed.

If it should now be desired to employ the auxiliary sensor, it is only necessary for the operator to remove the light tube means 16 of FIG. 1 and plug the end of the light sensor in the housing 14. The auxiliary light sensor 21 shown in FIG. 1 is then plugged into the outlet 24 of the housing and the sensing signal supplied to the computer will now be a function of light conditions at the remote location at which the auxiliary sensor 21 is used.

From the foregoing, it will thus be evident that the present invention has provided a greatly improved automatic exposure control wherein the various advantages of adjustable response time, easy calibration, control of acceptance angle, and even remote operation of the light assembly are all fully realized.

We claim:

1. In an automatic exposure control for a camera having a lens with variable iris opening control means, a light sensor for providing a sensing signal, a feedback potentiometer coupled to said variable iris opening control means for providing a control signal constituting a function of the size of said iris opening, a computer responsive to said sensing and control signals for providing an error signal constituting a function of the difference between said sensing and control signals, and a drive motor coupled to said potentiometer and responsive to said error signal to vary said potentiometer and thus the size of said iris opening in a manner to null said error signal, the improvement comprising: a film and shutter speed dial assembly having a control clutch means for enabling manual variation of said potentiometer without varying said iris opening control means, whereby a calibrated bias may be set into said potentiometer to adjust for the speed of film used in said camera relative to the shutter speed of said camera.

2. An automatic exposure control for a camera comprising:
   a. lens mounting means;
   b. a lens having a variable iris securable in operative position in said lens mounting means, said lens including:
      1. a manual iris opening control; and
      2. a lens ring gear surrounding said lens and connected to control said iris opening upon rotation;
   c. a light sensor assembly including:
      1. a light responsive cell and circuit secured to said lens mounting means adjacent to said lens for generating an electrical sensing signal constituting a function of the amount of light incident on said cell;
      2. a feedback potentiometer circuit having a potentiometer shaft and shaft ring gear for providing an electrical control signal constituting a function of the position of said shaft;
      3. gear coupling means connecting said shaft ring gear to said lens ring gear on said lens so that said electrical control signal is a function of the iris opening size;
      4. a computer circuit for receiving said sensing signal and said control signal and providing a feedback signal constituting a function of the difference of said sensing signal and control signal; and
      5. a stepper motor connected to said potentiometer shaft and responsive to said feedback signal to rotate said shaft in a direction to null said feed back signal, whereby said iris opening is adjusted in size automatically in accord with said sensing signal and said stepper motor is deenergized when ever said iris opening is properly adjusted for the amount of light incident on said cell.

3. The subject matter of claim 2, in which said gear coupling means includes:
   a. a disengagable gear means coupling rotation of said potentiometer shaft ring gear to said lens ring gear; and
   b. a film and shutter speed dial assembly mounted on said potentiometer shaft, said assembly including a control clutch means for enabling rotation of said potentiometer shaft without rotating said shaft ring gear whereby a calibrated bias may be set into said potentiometer to adjust for the speed of film used in said camera relative to the shutter speed of said camera whenever said film is changed to a film of different speed.

4. The subject matter of claim 2, in which said light sensor assembly includes interchangable light tube means for positioning in alignment with said cell to enable the acceptance angle of light received on said cell to be varied in accord with the area of an object desired to be exposed without changing the total integrated light incident on said cell.

5. The subject matter of claim 2, including an auxiliary light responsive cell and circuit for providing said sensing signal; and a connecting cable for passing said sensing signal to said computer whereby the iris opening of said lens may be automatically controlled in accordance with lighting conditions remote from said camera.